United States Patent [19]

Carter

[11] Patent Number: 4,678,155
[45] Date of Patent: Jul. 7, 1987

[54] MECHANISM ON A VEHICLE SEAT FOR ADJUSTING STIFFNESS OF RIDE

[75] Inventor: John W. Carter, Moline, Ill.

[73] Assignee: The Wise Company, Inc., Memphis, Tenn.

[21] Appl. No.: 941,201

[22] Filed: Dec. 12, 1986

[51] Int. Cl.$^4$ ............................................. F16M 13/00
[52] U.S. Cl. .................................... 248/564; 248/566; 248/585; 297/345
[58] Field of Search ...................... 248/564, 575, 162.1, 248/421, 585, 566, 631; 297/345

[56] References Cited

U.S. PATENT DOCUMENTS

| 3,194,531 | 7/1965 | Langer | 248/162.1 X |
| 3,572,624 | 3/1971 | Holdampf et al. | 248/564 |
| 3,599,232 | 8/1971 | Tabor | 248/575 |
| 3,806,075 | 4/1974 | Sturhan | 248/564 |
| 4,382,573 | 5/1983 | Aondetto | 248/564 |

FOREIGN PATENT DOCUMENTS 265739  6/1970  U.S.S.R. .............................. 248/564

Primary Examiner—James T. McCall
Attorney, Agent, or Firm—Glenn H. Antrim

[57] ABSTRACT

An adjustable slide in a seat suspension is connected through a plate to a link of a parallel linkage, and one end of a shock absorber is connected to the slide. The other end of the shock absorber is connected either to a support for a seat guided by the parallel linkage of a suspension or to a base to which the parallel linkage is connected. Means for changing the distance of the slide over the plate from an adjacent pivot adjusts stiffness or quality of ride.

2 Claims, 4 Drawing Figures

MECHANISM ON A VEHICLE SEAT FOR ADJUSTING STIFFNESS OF RIDE

BACKGROUND OF THE INVENTION

This invention relates to means in suspensions of vehicle seats for adjusting quality or stiffness of ride, and particularly to an adjustable assembly in a parallel linkage of a vehicle seat to change continuously the distance of the connection of an end of a shock absorber from an adjacent pivot of the suspension.

Conventionally, suspensions of vehicle seats include parallel linkages for guiding respective upper seat supports, and the heights of the seat supports are adjusted by changing positions of connections to helical springs or by changing pressure in air springs. For controlling quality or stiffness of ride, shock absorbers either as separate components or as parts of assemblies including the springs are commonly connected to the parallel linkages, and the locations of the connections of the shock absorbers to the parallel linkages are often fixed. When the connections to the shock absorbers are fixed, the shock absorbers cannot be adjusted to change the quality of ride to provide the most comfort for occupants of different weights riding over roads of different roughness.

Changing the quality of ride by changing the positions of coupling pins along a link of parallel linkage is shown in U.S. Pat. No. 3,806,075 issued to Klaus Sturhan on Apr. 23, 1974. The changing of the quality of ride by changing positions of a coupling pin does not provide ready, continuous adjustment for the quality of ride, and although the use of a continuous control mechanism is suggested, an obvious suitable control is not described nor made obvious. A continuous means of adjustment is shown in U.S. Pat. No. 3,194,531 issued to A. Langer on July 13, 1965, but since a spring and a shock absorber are contained in one assembly, adjustment of quality also requires separate adjustment of the spring to restore a particular height.

SUMMARY OF THE INVENTION

According to the present invention, a spring and a shock absorber in a suspension are separate assemblies, and the distance between one end of the shock absorber and a pivot of the suspension can be changed continuously a moderate desired amount by adjusting means to provide gradual change in the quality of ride without changing the height of a seat connected to the suspension. The other end of the shock absorber can be connected either to the support for a seat or to the base of the suspension. That end of the shock absorber to be repositioned is pivotally connected to a slider, and the slider is slidingly connected to a surface of a plate. The plate to be rotated with a link is connected rigidly to the link and its pivot, and the plate extends a required distance from the pivot to permit movement of the slider for a sufficient distance to and from the pivot for providing desired change in quality of ride. In a preferred embodiment, a retaining bolt extends from the slider through a guiding slot in the plate and through a washer that is held by a nut on the end of the bolt against the opposite surface of the plate. When the nut is properly tightened, the slider can be readily moved continuously by a lead screw, and still the slider is secured to the plate tightly enough to prevent noise that could be easily produced by any movement between the slider and the plate as the forces applied to the shock absorber rapidly reverse in direction. The lead screw has an end rotatively connected to the slider, and the intermediate portion of the screw engages threads in a spaced bracket that moves with the link.

DESCRIPTION OF THE PREFERRED EMBODIMENT

Figure 1:
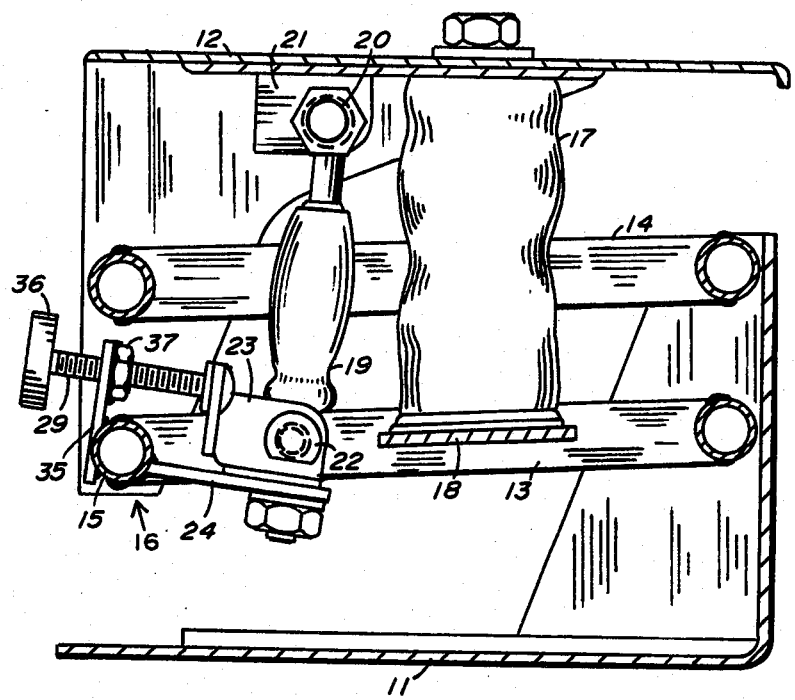
FIG. 1 is a cross-sectional view of a suspension according to this invention, a seat support being in an uppermost position, one side being cut away to show an adjusting mechanism.
Figure 2:
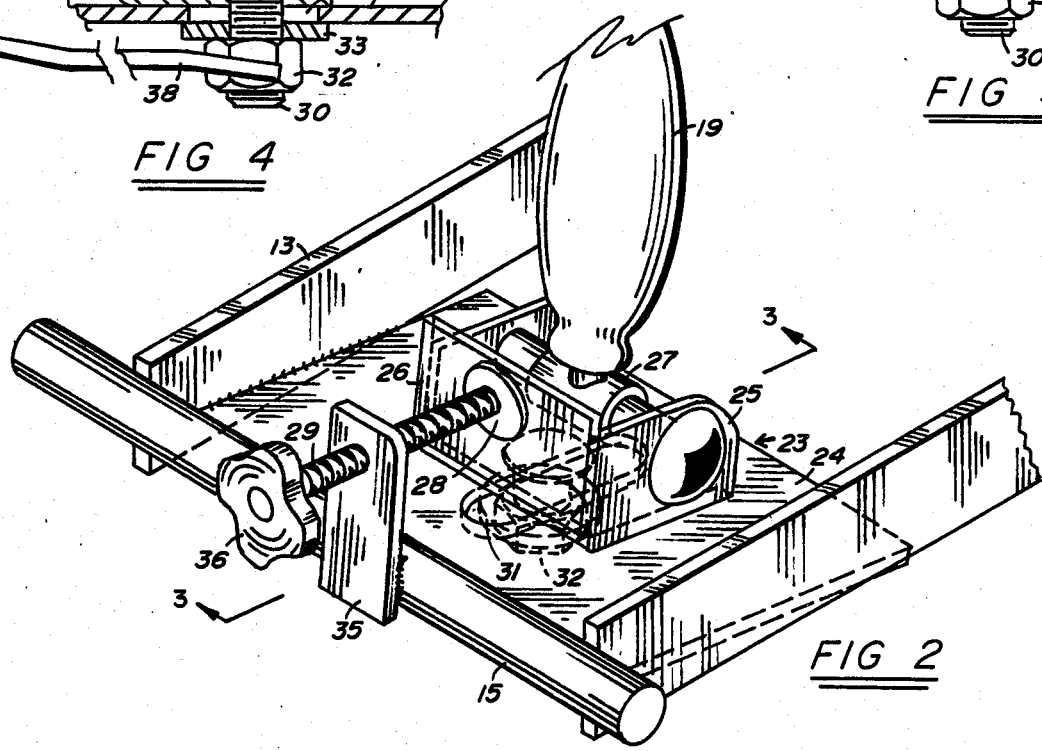
FIG. 2 is a fragmentary, perspective view of the adjusting mechanism including a slider of FIG. 1 as shown connected between one end of a shock absorber and a link of parallel linkage.

In a cross section of a suspension shown in FIG. 1, a base 11 and an upper parallel seat support 12 are interconnected by a lower link 13 and an upper link 14 of parallel linkage. At the rear of the suspension, the ends of the links 13 and 14 are connected to a pair of spaced pivots in a downward projection of the seat support 12, and the other ends of the links are connected to a pair of equally spaced pivots in a riser at the opposite end of the base 11, each pivot such as pivot 16 having a pivotal tube 15. As shown in FIG. 2, two spaced parallel links are connected to each pivotal tube 15, the closer two links horizontally opposite the links 13 and 14 being omitted in FIG. 1 in order to show the adjusting device of this invention more clearly. The seat support 12 is resiliently supported at a desired height in a conventional manner by an air spring 17 connected between a central portion of the seat support 12 and the center of a plate 18 that is secured between the two horizontally parallel members of the link 13.

The present invention relates to adjusting mechanism for positioning the shock absorber 19. The upper end of the shock absorber 19 is connected by a pivot 20 to a bracket 21, and the bracket is secured rigidly to the underside of the seat support 12, preferably on a central line of the seat support at a position between the air spring 17 and the rear of the suspension. The bracket 21 is located at a required distance from the rear edge of the seat support 12 to incline the shock absorber 19 slightly rearward in a downward direction toward a lower pivot 22 and a slider 23 connected to the lower end of the shock absorber, and the slider 23 is slidingly connected to the upper surface of a plate 24 that moves with the lower link 13. The lateral edges of the plate 24 are welded to the inside surfaces of the parallel members of the link 13, and the front edge of the plate 24 is welded to the pivotal tube 15. The plate 24 extends forward far enough to accommodate the required distance of movement of the slider 23 on a line midway between the members of the link 13. Typically, the pivotal connection of the lower end of the shock absorber 19 is movable between positions approximately 2 inches (50.8 mm) and 4 inches (101.6 mm) from the center of the pivotal tube 15 to change quality of ride from softest to firmest. The slider 23 is similar to the bracket 21 in that lateral vertical sides 25 support a bolt for providing a pivotal connection 27 to the lower end of the shock absorber 19, but a vertical rear plate 26 is added to accommodate a rotating connection 28 at the end of a lead screw 29.

The slider 23 is slidingly connected to the plate 24 by a bolt 30 (FIG. 3) extending from the base of the slider 23 through a slot 31 in the central portion of the plate 24. Typically, the slot 31 is centered between the members of the link 13 and extends somewhat over 2 inches (50.8 mm) to permit the bolt 30 to be guided in the slot the required distance for adjustment. Obviously, the diameter of the bolt 30 is slightly less than the width of the slot 31, and a self-locking nut 32 (FIG. 3) bears upwardly with only moderate force against a washer 33 positioned about the bolt 30 in contact with the lower surface of the plate 24. Generally, the slider 23 moves along satisfactorily with moderate force along the surface of the plate 24, but a sheet 34 of material such as low-friction polyethylene may be secured adjacent the bottom of the slider 23 and a washer 40 of the same material placed between the plate 24 and the washer 33 to facilitate sliding along the plate 24. If the washer 40 is rubber, the tightening of the nut 32 is less critical.

Figure 4:
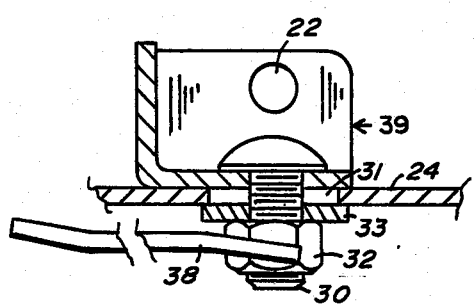
FIG. 4 fragmentary, cross-sectional view of the slider showing a rearwardly extending handle instead of a lead screw.
Figure 3:
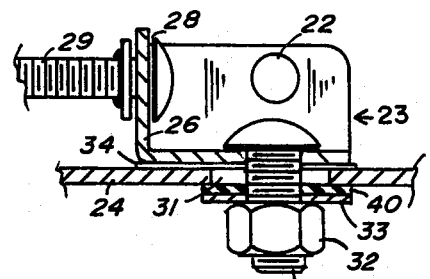
FIG. 3 is a fragmentary, cross-sectional view of the slider shown on line 3—3 of FIG. 2.

The slider 23 may be slid to desired settings along the plate 24 by various means. In FIG. 4, an equivalent slider 39 has the rear plate 26 omitted, and a rearwardly extending handle 38 (FIG. 4) is attached to the nut 32. A most convenient means as shown in FIG. 3 is the use of a lead screw 29 having a forward end connected by a rotative connection 28 to the rear plate 26 of the slider 23, an intermediate portion through a threaded hole in a plate or bracket 35, the bracket being connected to the pivotal tube 15 at the rear edge of the plate 24, and a knob 36 at the rear end of the lead screw 29 to be turned for conveniently adjusting quality of ride. The rotative connection 28 in the rear plate 26 of the slider 23 and the threaded hole or nut 37 (FIG. 1) in the bracket 35 are centered above the slot 31 and are at equal heights above the upper surface, or projection of the upper surface, of the plate 24. In the present embodiment, the bracket 35 is welded to the pivotal tube 15 for connecting the bracket rigidly perpendicular to the upper surface of the plate 24.

In use, the air spring 17 is inflated in the usual manner to obtain a desired height according to the weight of the occupant. For obtaining the softest ride, the knob 36 of the lead screw 29 is turned to move the slider 23 closest to the pivotal tube 15 such that the lower end of the shock absorber 19 is connected only about 2 inches (50.8 mm) from the center of the pivot; for various riding characteristics, through intermediate positions; and for maximum stiffness, about 4 inches (101.6 mm) from the pivot. The adjustment for quality of ride is independent of determination of height by the air spring 17, and because of the rigidity of the plate 24 and the firm sliding attachment of the slider 23, looseness in the direction of the motion of the shock absorber is eliminated to prevent noise.

I claim:

1. A suspension for a vehicle seat, said suspension having first and second supporting members spaced apart, said first supporting member being a support for said seat, said second supporting member being a base to be attached to a vehicle, each of said supporting members having a pair of pivots, first and second links connected between said supporting members, the ends of said links being connected to respective ones of said pivots to provide parallel linkage, a resilient member connected to said parallel linkage to support said first supporting member at a desired height, a shock absorber positioned apart from said resilient member and connected between any one of said supporting members and any one of said links, one end of said shock absorber being connected to said any one supporting member and the other end of said shock absorber being connected to said any one link at a position approximate a respective one of said pivots connected to said any one link, the improvement comprising:

an adjustable assembly connecting said other end of said shock absorber to said any one link, said adjustable assembling comprising:

a plate connected to said any one link, the position of said plate being approximate said respective pivot connecting said any one link to said any one supporting member, a surface of said plate facing said any one supporting member and being substantially normal to a line directed to said one end of said shock absorber, said surface extending a moderate desired distance along the length of said any one link, a slide positioned on said surface of said plate and restricted to move a moderate desired distance over said surface along a line directed from said respective pivot thereof in a plane substantially parallel to said any one link, means pivotally connecting said other end of said shock absorber to said slide, and adjusting means for setting said slide along said line within said moderate desired distance to control quality of ride without changing said desired height of said first supporting member for said seat.

2. A suspension for a vehicle seat having an adjustable assembly as claimed in claim 1 wherein said adjusting means comprises a lead screw, first and second brackets for retaining and positioning said lead screw, said first bracket being connected to said slide, said second bracket being connected to said respective pivot of said any one link for rotation therewith, said lead screw being turned through said second bracket for setting the longitudinal position of said lead screw, and one end of said lead screw rotatively connected to said first bracket for setting said slide, said lead screw being parallel with the line of movement of said slide.

* * * * *